(12) United States Patent
Lee

(10) Patent No.: US 11,623,477 B2
(45) Date of Patent: Apr. 11, 2023

(54) TIRE COMPOSITION

(71) Applicant: Hyun Chang Lee, Gyeonggi-do (KR)

(72) Inventor: Hyun Chang Lee, Gyeonggi-do (KR)

(*) Notice: Subject to any disclaimer, the term of this patent is extended or adjusted under 35 U.S.C. 154(b) by 0 days.

(21) Appl. No.: 17/581,991

(22) Filed: Jan. 24, 2022

(65) Prior Publication Data

US 2022/0145074 A1 May 12, 2022

Related U.S. Application Data

(63) Continuation of application No. PCT/KR2020/009593, filed on Jul. 21, 2020.

(30) Foreign Application Priority Data

| Jul. 25, 2019 | (KR) | 10-2019-0089931 |
| Nov. 15, 2019 | (KR) | 10-2019-0146603 |

(51) Int. Cl.
| *B60C 1/00* | (2006.01) |
| *B60C 19/08* | (2006.01) |
| *C08L 7/00* | (2006.01) |
| *C08L 9/00* | (2006.01) |
| *C08L 15/00* | (2006.01) |
| *C08L 19/00* | (2006.01) |
| *B60C 19/00* | (2006.01) |
| *B29D 30/00* | (2006.01) |

(52) U.S. Cl.
CPC ............. *B60C 1/00* (2013.01); *B60C 19/08* (2013.01); *C08L 7/00* (2013.01); *C08L 9/00* (2013.01); *C08L 15/00* (2013.01); *C08L 19/006* (2013.01); *B29D 2030/0077* (2013.01); *B29D 2030/0083* (2013.01); *B60C 2019/004* (2013.01)

(58) Field of Classification Search
CPC .. C08L 15/00; C08L 7/00; C08L 71/03; C08L 19/006; C08L 9/00; C08L 39/06; C08L 91/00; C08L 45/00; C08L 91/06; C08L 71/02; C08L 33/08; B60C 1/00; B60C 19/08; B60C 2019/004; C08K 3/22; C08K 5/40; C08K 5/47; C08K 3/04; C08K 3/36; C08K 5/548; C08K 3/06; C08K 5/09; C08K 5/18; B29D 2030/0077; B29D 2030/0083
See application file for complete search history.

(56) References Cited

U.S. PATENT DOCUMENTS

| 5,352,984 | A | 10/1994 | Piesinger |
| 6,326,424 | B1 | 12/2001 | Louis et al. |
| 2000/6021688 | | 2/2006 | Sandstrom |
| 2009/0308512 | A1 | 12/2009 | Nakamura |
| 2010/0011852 | A1 | 1/2010 | Andonian |

FOREIGN PATENT DOCUMENTS

| CN | 102101920 | A | 6/2011 |
| CN | 103183850 | A | 7/2013 |
| CN | 103341920 | A | 10/2013 |
| CN | 109500062 | A | 3/2019 |
| EP | 3073279 | A1 | 9/2016 |
| JP | 1983186462 | U | 12/1983 |
| JP | 2001264281 | A | 9/2001 |
| JP | 3427258 | B2 | 7/2003 |
| JP | 2010266332 | A | 11/2010 |
| JP | 5455668 | B2 | 3/2014 |
| KR | 101849525 | B1 | 4/2018 |
| KR | 1020190082519 | A | 7/2019 |
| KR | 1020210145714 | A | 12/2021 |

OTHER PUBLICATIONS

China National Intellectual Property Administration, Office Action for Chinese Patent Application No. 202080052620.3, dated Apr. 26, 2022, 6 pages.
PCT/ISA/210, ISA Korean Intellectual Property Office, International Search Report Issued on Application PCT/KR2020/009593, dated Feb. 10, 2021, 3 pages.
PCT/ISA/237, ISA Korean Intellectual Property Office, International Written Opinion Issued on Application PCT/KR2020/009593, dated Feb. 10, 2021, 5 pages.
Australian Government IP Australia, Office Action for Australian Patent Application No. 2020317953, dated Mar. 25, 2022, 5 pages.

*Primary Examiner* — Angela C Scott
(74) *Attorney, Agent, or Firm* — Nicholas Park

(57) ABSTRACT

The present disclosure relates to a method and manufacturing method for a tire tread composition having absorption properties with high electric conductivity and excellent wear resistance. Specifically, the present disclosure relates to the fabrication of a tire composition to be used as a non-pneumatic tire, the tire composition can be used as a mobile electrode with a water supply means that can identify the location of defects in the buried conductor using the tire electrode manufacturing with improved conductivity and contact resistance with the ground even though the tire compound has wear resistance by lowering the water swelling rate compared to the previous technology.

5 Claims, 7 Drawing Sheets

TIRE COMPOSITION

CROSS-REFERENCE TO RELATED APPLICATION

This application is a US Bypass Continuation application of International Application No. PCT/KR2020/009593, filed on Jul. 21, 2020, and designating the United States, the International Application claiming a priority date of Jul. 25, 2019, based on prior Korean Application No. 10-2019-0089931, filed on Jul. 25, 2019, and prior Korean Application No. 10-2019-0146603, filed on Nov. 15, 2019, the disclosure of which is incorporated herein by reference in its entirety.

BACKGROUND

Technical Field

The present disclosure relates to a tire tread composition having high electric conductivity and an absorption property excellent in wear resistance, and a method for manufacturing the same. Specifically, the present disclosure relates to the fabrication the tire composition to be used as a non-pneumatic tire. The tire can be used as a tire-shaped mobile electrode capable of detecting an earth potential rising position caused by a stray current leaking from an electrical duct bank (electric wire, pipeline, etc.) close to the road surface or from a structure on the ground (building, bridge, etc.).

Background Art

If a defect in the underground electrical cable or gas pipeline is not detected and repaired early, voltage or gas may leak from the defective part and pose a threat to the environment. In addition, a defect may cause electric shock or burns to people or animals, and may completely damage underground industrial installation.

In addition, since such leakage is wasteful, economic loss occurs. Causes of these defects include accidental damage caused by excavation, damage caused by electrolysis/corrosion of underground facilities, damage caused by deep roots of trees, and damage caused by aging of cables or pipelines.

Due to abovementioned defect, the buried conductor leaks the current to the ground through the defective surface insulation, which increases the earth potential is called stray current.

The techniques employed to detect defects by detecting leaking stray current from underground electrical cables, etc. are diverse and may take a long time. However, more than one method may not be sufficient to detect a leaking defect at once. The leak source can be detected with an electrical tester pen or an electric field detector. The electrical tester pen is a portable device that detects the potential difference between the user's hand and the object under test. The device is limited during operation due to potential differential interference between the user and the tester.

The infrared detection method introduced on page 696 of the SDA Handbook published by the US Department of Agriculture has a problem in that it requires a considerable expert who can analyze a measured temperature to detect a current leaking position from the recorded picture data.

Time Domain Reflectometry (TDR), which is a relatively recent technology, described in U.S. Pat. No. 5,352,984, is a technology capable of tracking and detecting an underground leakage, but has disadvantages in that it is difficult to use and takes a lot of time, and the measurement result is inaccurate. In addition, high-voltage radar techniques are widely used to track and detect underground voltage leaks, but these techniques have disadvantages such as time consuming, inaccurate, and require specific skills.

In the prior art, EP 3073279 A1, inventors have adopted a unique and effective method for detecting a source of underground voltage leaks. Here the prior art contains a usage of a metal ring and a mobile cart tire reinforced with a hydrophobic carbon fabric material, wherein the metal ring is connected to a voltage sensing electromagnetic sensor. During operation, the fabric covering the metal electrode is watered to reduce the interfacial electrical resistance between the ground surface and the source of underground voltage leaks. The prior art is unsatisfactory due to the following reasons: To reduce the interfacial resistance and high wear loss due to friction between the metal ring electrode, the fabric and the ground, the fabric wets the surface and cannot retain the water film. In addition, the metal ring creates an imbalance when moving on the ground, and the speed of movement is limited to a low speed of about 1.5 to 2.5 mph, so immediate detection of the leak source may be less.

In Korea Patent Publication Number No. 10-2019-0082519, to manufacture a tire with hydrophilicity and conductivity, a method of manufacturing a tire having hydrophilic conductive properties by using carboxylated-acrylonitrile-butadiene rubber (XNBR) as a main and manufacturing in a strip shape, by wrapping an outer surface of a non-conductive pneumatic tube with the strip shaped XNBR, and then forming a conductive tread on the outer surface was disclosed.

However, wear rate is high when the water-expansion rate is excessively maintained at 20% or more by using 20 to 30 parts by weight of a water-expandable material such as polyvinyl pyrrolidone (Polyvinyl pyrrolidone; hereinafter, PVP) (based on 100 parts by weight of the total rubber component), unnecessary wear occurs due to friction with the road surface while the tire is under the weight of the vehicle even when moving to the measurement area, when the conductive tread wear progresses, the non-conductive pneumatic tube surface is in contact with the ground, resulting in measurement failure.

The purpose of present disclosure is to replace electrically conductive metal electrodes with durable electrically conductive and hydrophilic elastic tread based electrodes, in order to improve the prior art for rapid signal detection using wheel electrodes based on the results of operating tire electrodes manufactured with existing technology and to ensure long-term durability. For this purpose, the tire electrode can be connected through a sensing array and attached to a mobile trailer, etc. of a structure that receives less weight, rather than a running tire, for quick detection of possible leaks, so that it can be used in contact with the ground only at a necessary position.

In addition, as a result of operation, when the water-expansion index is maintained at 20% or more, the abrasion is severe, and instead of improving the abrasion resistance by reducing the specific gravity of the water-expandable material, a tire electrode having lower conductivity and an appropriate amount of hydrophilicity is made.

To this end, extensive investigations of polymers have been carried out, including those most suitable for the purposes of the present disclosure. In general, elastomers (rubbers) are state-of-the-art materials for construction of tires with cap and groove pattern treads. In this technology, natural rubber (NR) has been widely disclosed for making tread compounds because it imparts high green strength and elasticity to the final tire product. A well-known intrinsic disadvantage of NRs is degradation due to oxidative attack of double bonds (C=C) in the backbone of NRs, as disclosed in the polymer handbook.

U.S. Pat. No. 6,326,424 discloses an isoprene-butadiene rubber (IBR) copolymer having a high glass transition temperature in rubber for tire tread, and it has the advantage that it can be used in combination with silica without a second matrix for emulsification, for example, styrene-butadiene rubber (SBR). Further, U.S. Pat. No. 2,821,232 discloses NR for tire tread reinforced only with SAF (super abrasion furnace) carbon black or a combination of SAP and silica. However, as is well known in the art, the above-disclosed rubber for tire tread is not suitable because abrasion, traction, and rolling resistance that cause energy loss are worse when only one type of rubber matrix is present.

Thus, there have been attempts to balance the physical properties of tires by introducing blends of other synthetic elastomers without NR, such as cis 1,4-polybutadiene rubber (BR), cis 1,4-polyisoprene rubber (IR), styrene butadiene rubber (SBR), acrylonitrile rubber (NBR), an ethylene-propylene copolymer (EPDM), etc, and by including a reinforcement material. To achieve a balance between abrasion resistance, traction and rolling resistance properties, it is a priority to incorporate a hardener into the uncured base rubber/blend compound prior to curing.

For example, as a kind of reinforcing material, it is known that it is most effective to use a mono or hybrid carbon-based filler such as carbon black, nanotubes, graphene, etc, in combination with silanized-silica till today. Although most components can vary from polar to non-polar, because typical tire tread compositions are generally hydrophobic, it is not suitable for the conductive hydrophilic tire which is pursued by the present inventors.

In general, it is understood by the person skilled in the art to use hydrophilic and/or water-swellable materials to prepare rubber compounds for tire treads. Such materials may include polar elastomers/polymers as water-swelling/water-absorbing materials such as cross-linked polyvinyl alcohol, cross-linked polyacrylates, cross-linked starch-acrylate copolymers, cross-linked carboxymethylcellulose or water-swellable urethane resins.

SUMMARY OF THE INVENTION

Technical Problem

The present disclosure is intended to improve the problems of the prior art, and the present disclosure relates to a tire tread composition having an absorption property with high electrical conductivity and excellent wear resistance, and a method for manufacturing the same.

Specifically, the present disclosure relates to the fabrication of a tire composition to be used as a non-pneumatic tire having an entire surface conductive, and the content of the water-expandable material is reduced to improve wear resistance. In addition, the present disclosure can be used as a mobile electrode having a water supply having a shape that is attached to a trailer instead of a vehicle body to reduce unnecessary wear during movement, or to contact the ground only during measurement to reduce tire weight.

Accordingly, an object of the present disclosure is to provide a conductive hydrophilic tire composition.

Another object of the present disclosure is to provide a device for determining the location of a defect in real time by identifying a position where the earth potential is raised by a stray current flowing out from a buried object or the like.

Another object of the present disclosure is to provide a method for determining the location of a defect in real time by identifying a location where the earth potential is raised by a stray current flowing out from a buried object or the like.

Technical Solution

The present disclosure relates to a tire tread composition and manufacturing method having high electric conductivity and excellent absorption properties in wear resistance. The present disclosure relates to the fabrication of a tire composition to be used as a non-pneumatic tire, wherein the tire can be used as a mobile electrode having a water supply for detecting an earth potential rising position.

The present disclosure will be described in more detail.

It is an object of the present disclosure to provide a rubber composition having mechanical durability (wear resistance), hydrophilicity and electric conductivity.

According to the present disclosure, the tire composition is comprised in an amount of 10 to 100 parts by weight of polar rubber based on 100 parts by weight of the total rubber component.

According to the present disclosure, the polar rubber could be at least one selected from the group consisting of natural rubber, polybutadiene rubber, and epichlorohydrin polyethylene oxide allyl glycidyl ether.

According to the present disclosure, the natural rubber is comprised in an amount of 0 to 80 parts by weight, 60 to 75 parts by weight, 70 to 80 parts by weight, for example, 70 to 75 parts by weight, preferably, 73 parts by weight, based on 100 parts by weight of the total rubber component.

According to the present disclosure, the polybutadiene rubber is comprised in an amount of 10 to 15 parts by weight, 11 to 15 parts by weight, 12 to 15 parts by weight, 13 to 15 parts by weight, 14 to 15 parts by weight, preferably, 15 parts by weight, based on 100 parts by weight of the total rubber component.

According to the present disclosure, the epichlorohydrin polyethylene oxide allyl glycidyl ether is comprised in an amount of 5 to 10 parts by weight, 6 to 10 parts by weight, 7 to 10 parts by weight, 8 to 10 parts by weight, 9 to 10 parts by weight, preferably, 10 parts by weight, based on 100 parts by weight of the total rubber component.

According to the present disclosure, the tire composition may be the composition in which a desirable amount of a water-absorbing and water-soluble polymer to obtain hydrophilicity properties is homogeneously dispersed in the composition through a mechanical mixing process.

According to the present disclosure, the polymer may be a water swelling material, for example, a polymer material.

According to the present disclosure, the polymer material could be at least one selected from the group consisting of polyethylene oxide, cross-linked polyvinyl alcohol, cross-linked polyacrylate, cross-linked starch-acrylate copolymer, cross-linked carboxymethyl cellulose, polyacrylonitrile (PAN), polyvinyl Alcohol (PVA), polyvinylpyrrolidone (PVP), polyvinylidene fluoride (PVDF), polymethyl methacrylate (PMMA), polyacrylic acid and polyurethane, however, it is not limited to those mentioned above, and includes all water swelling material known in the art.

According to the present disclosure, the water swelling material is comprised in an amount of 1 to 10 parts by weight, 1 to 9 parts by weight, 1 to 8 parts by weight, 1 to 7 parts by weight, 1 to 6 parts, 1 to 5 parts by weight, 1 to 4 parts by weight, for example, 1 to 3 parts by weight, preferably, 2 parts by weight, based on 100 parts by weight of the total rubber component, however, it is not limited to those mentioned above, their water solubility and expansion degree may be adjusted in consideration of the degree of hydrolysis, thickness, and the like.

In one embodiment of the present disclosure, when the water swelling material is polyethylene oxide, the polyethylene oxide is comprised in an amount of 1 to 10 parts by weight, 1 to 9 parts by weight, 1 to 8 parts by weight 1 to 7 parts by weight, 1 to 6 parts by weight, 1 to 5 parts by weight, 1 to 4 parts by weight, for example, 1 to 3 parts by weight, preferably, 2 parts by weight, based on 100 parts by weight of the total rubber component.

The tire composition of the present disclosure may further include a reinforcing material.

If the rubber blend does not include a reinforcing material, the physical-mechanical properties are poor, so that the rubber blend is difficult to use in the tire. Therefore, the strength is increased, and in some cases, a reinforcing material can be additionally included to increase thermal and/or electrical properties.

The tire composition of the present disclosure may comprise in an amount of 5 to 30 parts by weight of a reinforcing material based on 100 parts by weight of the total component.

According to the present disclosure, the reinforcing material may be silanized-silica and carbon-based fillers, and for example, may be at least one selected from the group consisting of carbon black, carbon nanotubes, silica, and a coupling material. When two or more types are included, these components may have a synergistic effect with each other, but are not limited thereto.

In order to increase the strength and electric conductivity properties of the composition According to the present disclosure, the composition may additionally include about 5 to 30 parts by weight of carbon black (CB) based on 100 parts by weight of the total rubber component.

In the disclosure, the carbon black may be a conductivity grade carbon black, for example, the first carbon black, the second carbon black, and/or the third carbon black, but is not limited thereto.

According to the present disclosure, the first carbon black (EC600JD) is comprised in an amount of a BET surface area of about 1270 m $2/g$ as measured by the Bruner, Emmett, and Teller surface areas (hereinafter "BET surface area") using nitrogen gas, and by weight, 5 to 30 parts by weight, preferably 20 to 30 parts by weight, based on 100 parts by weight of the total rubber component. The first carbon black has a DBP (value representing the structure of the reinforcing filler) of 480 to 510 mL/100 g, preferably 498 mL/100 g.

According to the present disclosure, the second carbon black (N550) is comprised in an amount of a BET surface area of 35 to 45 m $2/g$, preferably 35 to 40 m $2/g$, and 5 to 15 parts by weight, preferably 5 to 10 parts by weight, based on 100 parts by weight of the total rubber component. The second carbon black has an I2 water absorption (iodine absorption amount representing the surface area of the reinforcing material) of about 37 to 47 g/kg, preferably 42.5 g/kg, as measured according to ASTM D1510.

Since the DBP value and the water absorption amount of I2 are major factors determining the physical and chemical properties of carbon black, it is difficult to expect an effect of improving the electrical conductivity if the DBP value, the I2 water absorption amount and the addition amount of the carbon black are out of the above ranges.

According to the present disclosure, the third carbon black (N220) has a BET surface area of 100 to 121 m $2/g$. The third carbon black has an I2 water absorption of about 116 to 126 g/kg, preferably 123.3 g/kg, as measured according to ASTM D1510. When a third carbon black is included, based on 100 parts by weight of the total rubber component, the first carbon black is 20 to 25 parts by weight, and the second and third carbon blacks are about 5 to 10 parts by weight in combination of the two components, can be included as much.

In addition, According to the present disclosure, the third carbon black may be included in place of the second carbon black. If the total amount of carbon black does not fall within the specified range, it is not preferable because the effect of improving electric conductivity cannot be expected.

According to the present disclosure, when the tire composition includes silica, the silica is comprised in an amount of 2.0 to 10.0 parts by weight, 2.0 to 9.0 parts by weight, 2.0 to 8.0 parts by weight, 2.0 to 7.0 parts by weight, 2.0 to 6.0 parts by weight, 2.0 to 5.0 parts by weight by weight, For example, 2.0 to 4.0 parts by weight based on 100 parts by weight of the total rubber component. If it is less than the above range, the effect of reducing the rotational resistance, which is the purpose of adding silica, is insufficient, and if it exceeds the above range, the effect of improving electrical conductivity by the carbon black used According to the present disclosure is hindered, so it is not preferable.

According to the present disclosure, the BET surface area based on nitrogen absorption of the silica is comprised in an amount of 150 to 200 m $2/g$, 150 to 190 m $2/g$, 150 to 180 m $2/g$, 150 to 170 m $2/g$, 160 to 200 m $2/g$, 160 to 190 m $2/g$, 160 to 180 m $2/g$, 160 to 170 m $2/g$, for example, may be 164 m $2/g$.

According to the present disclosure, the term "BET surface area" means the total surface area including the porosity of the reinforcing material.

According to the present disclosure, the pH of the silica is 0 to 13, 1 to 13, 2 to 13, 3 to 13, 4 to 13, 5 to 13, 6 to 13, 7 to 13, 8 to 13, 9 to 13, 10 to 13, 11 to 13, 0 to 12, 1 to 12, 2 to 12, 3 to 12, 4 to 12, 5 to 12, 6 to 12, 7 to 12, 8 to 12, 9 to 12, 10 to 12, may be 11 to 12 days. For example, it may be 11.2, but is not limited thereto.

According to the present disclosure, since the BET value and the like are major factors determining the properties of silica, if the BET value of silica is out of the above-specified range, fairness deteriorates, which is not preferable.

According to the present disclosure, the tire composition may further include a coupling material to improve dispersion of silica. The coupling material helps the silica particles to be uniformly dispersed on the rubber, while maintaining a strong bond between the rubber and the silica. Because silica has a small molecular weight and can form chemical bonds with polymer particles, they must contain functional groups that react with the filler and matrix.

According to the present disclosure, the coupling material may be a silane coupling material, but is not limited thereto, and may vary depending on materials and process conditions used.

According to the present disclosure, the coupling material is comprised in an amount of 0.5 to 2.0 parts by weight, 0.5 to 1.9 parts by weight, 0.5 to 1.8 parts by weight, 0.5 to 1.7 parts by weight, 0.5 to 1.6 parts by weight, for example, 0.5 to 1.5 parts by weight, based on 100 parts by weight of the total composition.

The tire composition according to the present disclosure may further include conventional additives known in the rubber/tire industry.

According to the present disclosure, the additive may be a sulfur vulcanizing agent, an accelerator, an activator, an antioxidant, a wax, a process oil, and the like, but is not limited thereto.

According to the present disclosure, the additive is included in an amount recognized as a desirable range in the rubber/tire industry, which is known.

In one embodiment of the present disclosure, the tire composition may further include a plasticizer to reduce the energy required for the process through easy processability by lowering the viscosity.

According to the present disclosure, examples of the plasticizer include mineral oil, and these oils are composed of hydrocarbons that are a mixture of aromatic, naphthalenic and paraffinic structures.

According to the present disclosure, the plasticizer may be a polar to non-polar plasticizer depending on the polarity of the carbon polymer used.

According to the present disclosure, the non-polar oil is an intermediate extraction solvent (Mild Extracted Solvent (MES)), a residual aromatic extraction solvent (Residual Aromatic Extracted Solvent (RAE)) and a distillation treatment aromatic extraction solvent (Treated Distillate Aromatic Extracted Solvent (TDAE)) in can be selected.

According to the present disclosure, the polar oil may be a synthetic oil described in U.S. Pat. Nos. 6,248,929, 6,399,697, and 6,410,816, or a derivative of phthalic acid, adipic acid, or sebacic acid, but is not limited thereto.

In one embodiment of the present disclosure, the plasticizer may be a rubber compounding oil (Treated Distillate Aromatic Extract).

According to the present disclosure, the plasticizer is comprised in an amount of 5 to 40 parts by weight, 5 to 38 parts by weight, 5 to 36 parts by weight, 5 to 34 parts by weight, 5 to 32 parts by weight, for example, 5 to 30 parts by weight, based on 100 parts by weight of the total rubber component.

In one embodiment of the present disclosure, the rubber compounding oil typically used may be of an aromatic type having a density of 0.9530 at 15° C. according to ASTM D4052 standard and 19.29 at 100° C. according to ASTM D445 standard, respectively, for example, it could be a Plasthall P-900.

The coach time (t s2) of the tire composition of the present disclosure may be 0.6 to 1.1, for example, 0.6 to 1.0.

The purification time (T90) of the tire composition of the present disclosure is 2.0 to 14.5, 2.0 to 13.5, 2.0 to 12.5, 2.0 to 11.5, 2.0 to 10.5, 2.0 to 9.5, 2.0 to 8.5, 2.0 to 7.5, 2.0 to 6.5, 2.0 to 5.5, for example, may be 2.0 to 5.0.

The ML (dNm) of the tire composition of the present disclosure may be 13.9 to 20.0, 14.0 to 20.0, 14.5 to 20.0, 15.0 to 20.0, 15.5 to 20.0, for example, may be 16.0 to 20.0.

MH (dNm) of the tire composition of the present disclosure is 28 to 77, 28 to 70, 28 to 65, 28 to 60, 28 to 55, 30 to 77, 30 to 70, 30 to 65, 30 to 60, 30 to 55, for example, may be 30 to 50.

The tensile strength (MPa) of the tire composition of the present disclosure may be 5 to 20, 6 to 20, 7 to 20, for example, may be 8 to 20.

The 100% modulus (MPa) of the tire composition of the present disclosure may be 1.0 to 8.0, 1.1 to 8.0, 1.2 to 8.0, 1.3 to 8.0, 1.4 to 8.0, for example, may be 1.5 to 8.0.

The 200% modulus (MPa) of the tire composition of the present disclosure may be 4 to 15, 5 to 15, 6 to 15, 7 to 15, for example, may be 8 to 14.

Tensile (%) at the time of crushing of the tire composition of the present disclosure is 150 to 700, 200 to 700, 250 to 700, 150 to 600, 200 to 600, 250 to 600, 150 to 500, 200 to 500, 250 to 500, 150 to 400, 200 to 400, for example, may be 250 to 400.

The rebound at 25° C. of the tire composition of the present disclosure is 20 to 70, 20 to 65, 20 to 60, 20 to 55, 20 to 50, 25 to 70, 25 to 65, 25 to 60, 25 to 55, for example, may be 25 to 50.

The hardness (Shore A) of the tire composition of the present disclosure is 20 to 80, 30 to 80, 40 to 80, 50 to 80, 20 to 75, 30 to 75, 40 to 75, for example, may be 50 to 75.

The wear loss (mm$^3$) of the tire composition of the present disclosure may be 150 to 200, 155 to 200, 160 to 200, 150 to 195, 155 to 195, for example, may be 160 to 195.

The contact angle (o) of the tire composition of the present disclosure is 10 to 90, 20 to 90, 30 to 90, 40 to 90, 50 to 90, 60 to 90, 70 to 90, 80 to 90, 10 to 88, 20 to 88, 30 to 88, 40 to 88, 50 to 88, 60 to 88, 70 to 88, 80 to 880, for example, may be 80 to 88.

The degree of water expansion (%) of the tire composition of the present disclosure is 0 to 100, 0 to 90, 0 to 80, 0 to 70, 0 to 60, 0 to 50, 0 to 40, 0 to 30, 0 to 20, 0 to 10, 0 to 5, 0.5 to 100, 0.5 to 90, 0.5 to 80, 0.5 to 70, 0.5 to 60, 0.5 to 50, 0.5 to 40, 0.5 to 30, 0.5 to 20, 0.5 to 10, 0.5 to 5, for example, may be 0.5 to 3.

The electrical resistance (Ω·cm) of the tire composition of the present disclosure is 5 to 200, 5 to 150, 5 to 100, 5 to 50, 10 to 200, 10 to 150, 10 to 100, 10 to 50, 15 to 200, 15 to 150, 15 to 100, for example, may be 15 to 50.

In order to prepare a tire composition according to the present disclosure, the rubber blend excluding the accelerator, activator, and curing agent may be first mixed with a reinforcing material (first mixing step), and then the accelerator, activator and/or curing agent may be mixed. (second mixing step).

According to the present disclosure, the first mixing step may be performed at about 90° C. for 5 minutes, but is not limited thereto.

According to the present disclosure, the second mixing step may be performed at about 50° C. for 2 minutes, but is not limited thereto.

According to the present disclosure, a method for manufacturing a tire composition can comprise a step of mounting a two-roll mill for a time in which rubber components and other components are adjusted in order to achieve optimal physical-mechanical properties and to obtain a homogeneous mixture.

According to the present disclosure, the time of the step of passing through the double-roll mill may be 5 to 20 minutes, 5 to 15 minutes, 10 to 20 minutes, for example, may be 10 to 15 minutes.

According to the present disclosure, the temperature of the double-roll mill step is 25 to 120° C., 25 to 110° C., 25 to 100° C., 25 to 90° C., 25 to 80° C., 25 to 70° C., 25 to 60° C., For example, it may be 25 to 50° C., but is not limited thereto, and may be determined according to the properties of the desired composition.

Another example of the present disclosure relates to a tire electrode made of a conductive hydrophilic tire composition.

The conductive hydrophilic tire composition is the same as described above.

According to the present disclosure, placing electrical wires between the composition of strips to be cured and connecting the tire electrode to a measuring device after curing, but is not limited thereto.

According to the present disclosure, the tire electrode may have a groove formed in a direction perpendicular to the outer circumferential surface of the tire electrode to form a water film during movement, but is not limited thereto.

According to the present disclosure, the tire electrode may be attached to a traction type device. By attaching the tire electrode to the traction type device, it is possible to reduce a weight burden and improve a wear rate. For this purpose, it may be attached to a lightweight additional vehicle, for example, a trailer (a towed auxiliary vehicle, etc.) instead of the vehicle body.

Alternatively, According to the present disclosure, the tire electrode may be installed together with a separate driving tire. For example, it may be attached in the form of an auxiliary tire that is less burdensome by having the separate driving tire to share the weight.

Alternatively, According to the present disclosure, the tire electrode may have a structure such that it is installed together with a vertical adjustment device to contact the ground only when necessary.

Another example of the present disclosure relates to a movable defect localization device including the tire electrode.

According to the present disclosure, the device may use a tire electrode to measure the earth potential in contact with the ground surface, and detect a point where the earth potential is raised due to a stray current by moving it to the vehicle to determine the defect location.

According to the present disclosure, the tire electrode is the same as described above.

Another example of the present disclosure relates to a method for detecting a stray current occurrence location.

According to the present disclosure, the method may be performed using a tire electrode.

According to the present disclosure, the tire electrode is the same as described above.

According to the present disclosure, the tire electrode may be attached to a vehicle or trailer.

According to the present disclosure, the method may include measuring an earth potential through a surface in contact with the earth.

According to the present disclosure, the method may be to identify a defect in a conductor buried underground or a conductor included in a structure on the ground by identifying a stray current occurrence location.

In one embodiment of the present disclosure, the method, in order to identify the defects of the conductors buried underground or the conductors included in the structures on the ground, may be a method of determining the location of a stray current caused by a defect by attaching a tire electrode to a vehicle or trailer, moving it, and measuring an earth potential through a surface in contact with the ground.

The term "or" in this disclosure is intended to mean an inclusive "or" rather than an exclusive "or." In other words, unless otherwise specified or clear from context, "X employs A or B" is intended to mean one of the natural implicit substitutions. In other words, X employs A; X employs B; or when X employs both A and B, "X employs A or B" may apply to either of these cases. It should also be understood that the term "and/or" as used herein refers to and includes all possible combinations of one or more of the listed related items.

The terms "comprises" and/or "comprising" According to the present disclosure mean that the feature and/or element in question is present. However, it should be understood that this does not exclude the presence or addition of one or more other features, elements and/or groups thereof. Also, unless otherwise specified or unless the context is clear as to designating a singular form, the singular in the specification and claims should generally be construed to mean "one or more".

DETAILED DESCRIPTION

[Modes of the Invention]

Figure 1:
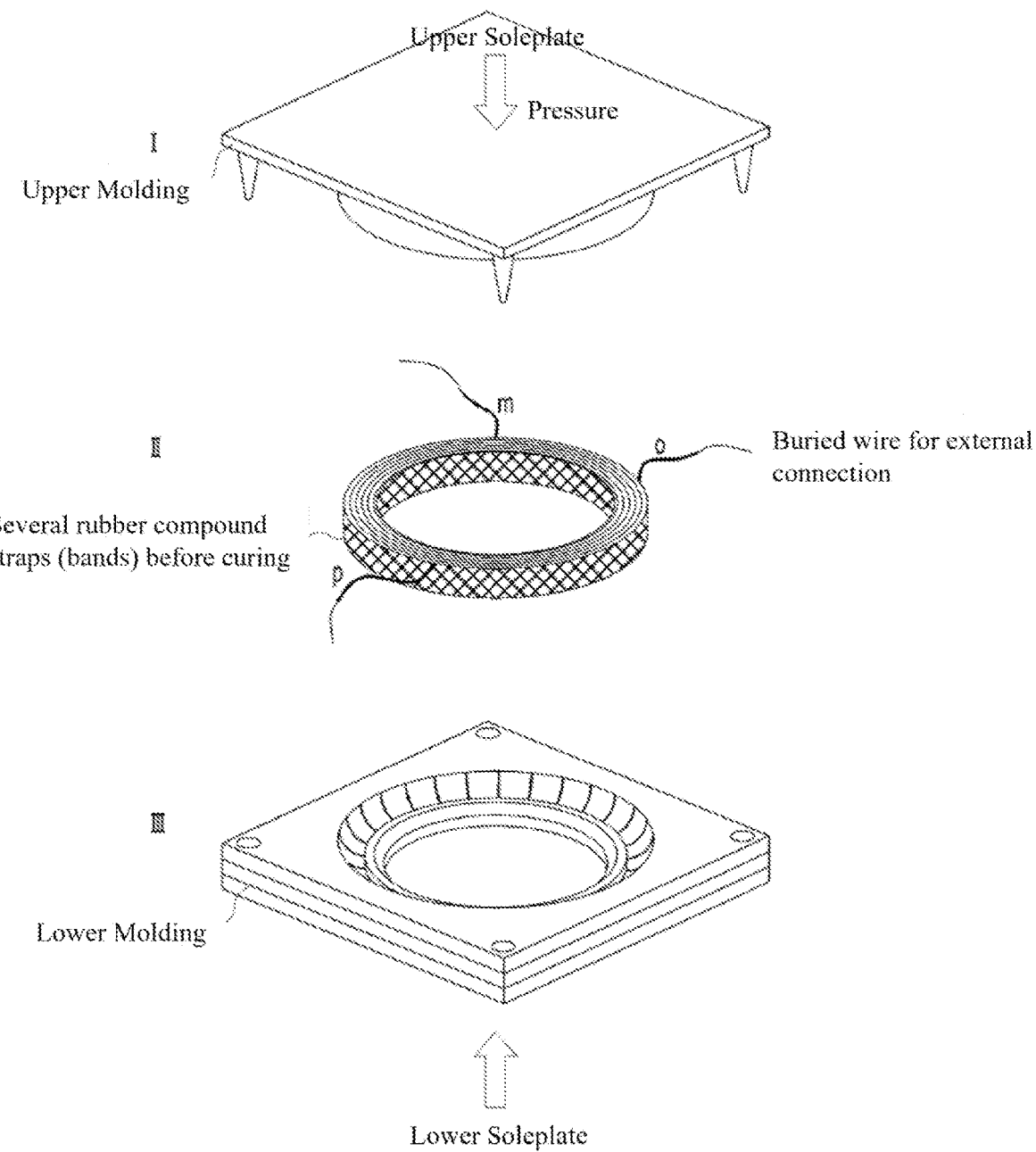
FIG. 1 schematically illustrates the nature of the mold design and approach that may be employed to obtain a non-pneumatic curing tire with permanently embedded lead wires.

Various embodiments and/or aspects are now disclosed with reference to the drawings. In the following description, for purposes of explanation, numerous specific details are set forth to provide a thorough understanding of one or more aspects. However, it will also be recognized by one of ordinary skill in the art of this disclosure that such aspect(s) may be practiced without these specific details.

The following description and accompanying drawings set forth in detail certain illustrative aspects of one or more aspects. These aspects are illustrative, however, and some of the various methods in principles of various aspects may be employed, and the descriptions set forth are intended to include all such aspects and their equivalents.

Glossary of Terms

S-SBR: Solution polymerized styrene-butadiene rubber
NR: Natural Rubber
ENR: Epoxide Natural Rubber
XNBR: carboxylated acrylonitrile butadiene rubber
BR: polybutadiene rubber
GECO: epichlorohydrin polyethylene oxide allyl glycidyl ether
EC600JD, N550, N220: Different types of carbon black with specifications described
TDAE: Treated Distillate Aromatic Extract
S/T: Stearic acid TMQ: 2,2,4-Trimethyl-1,2-Dihydroquinoline polymer
6PPD: 1,3-dimethylbutyl)-N'-phenyl-p-phenylenediamine
CZ: N-Cyclohexyl-2-benzothiazole sulfonamide
TMTD: Tetramethyl thiuram disulfide
E-80: Retarder
PVA: polyvinylalcohol
PVP: Polyvinylpyrrolidone
CSP: Crosslinked sodium polyacrylate
CF: Cellulose Fibers

PREPARATION EXAMPLE. PREPARATION OF TIRE COMPOSITION

A tire composition was prepared with the materials and composition ratios shown in Tables 1 to 4 below. Specifically, the rubber blend excluding the accelerator, activator and hardener was mixed with the reinforcing material (first mixing step). The accelerator, activator and/or curing agent are then mixed (second mixing step). The first mixing step was performed at about 90° C. for 5 minutes, and the second mixing step was performed at about 50° C. for 2 minutes. In order to achieve optimal physico-mechanical properties and obtain a homogeneous mixture, it is preferable to subject the rubber component and other components to a two-roll mill for a controlled period of time.

TABLE 1

| composition/code | S1 | S2 | S3 | S4 |
|---|---|---|---|---|
| NR | 15 | 73 | 15 | 40 |
| BR | 10 | 15 | 73 | 15 |
| GECO | 73 | 10 | 10 | 40 |
| PEO | — | 2 | — | — |
| PVC | 0.5~50 | — | — | — |
| CSP | — | — | 0.5~50 | — |
| CF | — | — | — | 0.5~50 |
| ZnO | 4 | 4 | 4 | 4 |
| TMTD | 1 | 1 | 1 | 1 |
| CZ | 0.5 | 0.5 | 0.5 | 0.5 |
| EC600JD | 26 | 26 | 26 | 26 |
| N550 | — | — | 4 | 4 |
| N220 | 4 | 4 | — | — |
| silica | 2 | 2 | 2 | 2 |
| silane | 0.5 | 0.5 | 0.5 | 0.5 |
| sulfur | 2 | 2 | 2 | 2 |
| S/T | 1.4 | 1.4 | 1.4 | 1.4 |
| 6PPD | 1 | 1 | 1 | 1 |
| TMQ | 2 | 2 | 2 | 2 |
| wax | 1 | 1 | 1 | 1 |
| TDAE | 5~35 | 5~35 | 5~35 | 5~35 |

TABLE 2

| composition/code | A1 | A2 | A3 | A4 |
|---|---|---|---|---|
| ENR | 100 | 70 | 30 | 50 |
| XNBR | 0 | 30 | 70 | 50 |
| PEO | 0.5~50 | — | — | — |
| PVP | — | 0.5~50 | — | — |
| CSP | — | — | 0.5~50 | — |
| CF | — | — | — | 0.5~50 |
| ZnO | 4.5 | 4.5 | 4.5 | 4.5 |
| TMTD | 1 | 1 | 1 | 1 |
| CZ | 0.5 | 0.5 | 0.5 | 0.5 |
| EC600JD | 20 | 20 | 20 | 20 |
| N550 | 7 | 7 | 7 | 7 |
| N220 | 3 | 3 | 3 | 3 |
| silica | 5 | 5 | 5 | 5 |
| silane | 2 | 2 | 2 | 2 |
| sulfur | 2 | 2 | 2 | 2 |
| S/T | 1.4 | 1.4 | 1.4 | 1.4 |
| 6PPD | 1 | 1 | 1 | 1 |
| TMQ | 2 | 2 | 2 | 2 |
| E-80 | 0.4 | 0.4 | 0.4 | 0.4 |
| wax | 1 | 1 | 1 | 1 |
| TDAE | — | — | — | — |
| Glycerol | 5 | 5 | 5 | 5 |
| Plasthall P-900 | 6~50 | 6~50 | 6~50 | 6~50 |

TABLE 3

| composition/code | B1 | B2 | B3 | B4 |
|---|---|---|---|---|
| GECO | 100 | 70 | 30 | 50 |
| XNBR | 0 | 30 | 70 | 50 |
| PEO | 0.5~50 | — | 40 | 60 |
| PVP | — | 0.5~50 | — | — |
| CSP | — | — | 0.5~50 | — |
| CF | — | — | — | 0.5~50 |
| ZnO | 4.5 | 4.5 | 4.5 | 4.5 |
| TMTD | 1 | 1 | 1 | 1 |
| CZ | 0.5 | 0.5 | 0.5 | 0.5 |
| EC600JD | 20 | 20 | 20 | 20 |
| N550 | 7 | 7 | 7 | 7 |
| N220 | 3 | 3 | 3 | 3 |
| silica | 5 | 5 | 5 | 5 |
| silane | 2 | 2 | 2 | 2 |
| sulfur | 2 | 2 | 2 | 2 |
| S/T | 1.4 | 1.4 | 1.4 | 1.4 |
| 6PPD | 1 | 1 | 1 | 1 |
| TMQ | 2 | 2 | 2 | 2 |
| E-80 | 0.4 | 0.4 | 0.4 | 0.4 |
| wax | 1 | 1 | 1 | 1 |
| Glycerol | 5 | 5 | 5 | 5 |
| Plasthall P-900 | 6~50 | 6~50 | 6~50 | 6~50 |

TABLE 4

| composition/code | C1 | C2 | C3 | C4 |
|---|---|---|---|---|
| EVA | 100 | 70 | 30 | 50 |
| XNBR | 0 | 30 | 70 | 50 |
| PEO | 0.5~50 | — | 40 | 60 |
| PVP | — | 0.5~50 | — | — |
| CSP | — | — | 0.5~50 | — |
| CF | — | — | — | 0.5~50 |
| ZnO | 4.5 | 4.5 | 4.5 | 4.5 |
| TMTD | 1 | 1 | 1 | 1 |
| CZ | 0.5 | 0.5 | 0.5 | 0.5 |
| EC600JD | 20 | 20 | 20 | 20 |
| N550 | 7 | 7 | 7 | 7 |
| N220 | 3 | 3 | 3 | 3 |
| Silica | 5 | 5 | 5 | 5 |
| Silane | 2 | 2 | 2 | 2 |
| Sulfur | 2 | 2 | 2 | 2 |
| S/T | 1.4 | 1.4 | 1.4 | 1.4 |
| 6PPD | 1 | 1 | 1 | 1 |
| TMQ | 2 | 2 | 2 | 2 |
| E-80 | 0.4 | 0.4 | 0.4 | 0.4 |
| Wax | 1 | 1 | 1 | 1 |
| TDAE | — | — | — | — |
| Glycerol | 5 | 5 | 5 | 5 |
| Plasthall P-900 | 6~50 | 6~50 | 6~50 | 6~50 |

EXPERIMENTAL EXAMPLE. PHYSICAL PROPERTY EVALUATION

The physical properties of the tire composition of the above example and the commercial standard tire composition were measured.

To evaluate the physical properties, after each tire sample manufactured was cut to an appropriate size, water swelling test, tensile strength test, electrical resistance measurement, and wear resistance measurement were performed. Specifically, in order to prepare a sample, the composition prepared in Preparation Example was sheeted out and vulcanized at 100 to 190° C. and preferably 120 to 160° C. in a moving die rheometer.

Optimal vulcanization properties can be modified so that the resulting sample has the desired standard properties. Finally, 2.5 to 5.0 MPa, preferably 5.0 MPa, was applied in a hot-press and subjected to a standard procedure for testing physical properties.

Experimental Example 1. Water Swelling Test

After cutting the sample to a thickness of about 3 cm×3 cm and 2 mm, the initial weight was weighed, and then the weight was weighed after absorption of water. The degree of expansion was calculated using the following formula, and the results are shown in Table 5 below.

$$\text{swelling degree; } Sd = \frac{u-v}{u} \times 100 \quad \text{[Calculation formula]}$$

V: initial weight of sample, u: final weight of sample.

Experimental Example 2. Tensile Strength Test

Tensile strength (TS) measurements of cured specimens (10 cm×2 mm×2.5 cm) were performed using a QM100s machine (QMESYSTEM, Korea) at a crosshead speed of 500 mm/min and a temperature of 25° C. in ASTM D412 Performed according to standards. The tensioning machine was locked 2.5 cm from both ends of the sample and spaced about 5 mm apart. In operation, the fixed end stretches the sample so that the stress is applied over the remaining 5 mm distance until the stress is released (highest tensile strength). After entering the thickness and stress application area, the machine made and recorded tensile strength graphs versus elongation (mm/mm) or strain (100%), and a minimum of 3 samples was repeated and the average value recorded. The results are shown in Table 5 below.

Experimental Example 3. Electrical Resistance Measurement

The surface electrical resistance of cured rectangular specimens (5 cm×1.5 cm×2 mm) was measured with a hand-held high-resistance meter. Care was taken to ensure that the surface of the specimen was in good contact with the electrode of the conduction tester. The distance between the conductivity electrodes of the tester was kept constant at about 2 cm. The measured resistance was converted to the volume resistivity ρv using the following formula, and the results are shown in Table 5 below.

$$\text{Volume resistance } (\rho v) = (WtR)/(L) \quad \text{[Calculation formula]}$$

W: width, t: thickness, L: distance between electrodes

Experimental Example 4. Measurement of Wear Resistance

Wear resistance was measured using a DIN wear instrument (QMESYS Co. Ltd.). Specifically, a cylindrical rubber test piece (about 6 mm thick) was made and polished against a polishing surface mounted on a rotating cylindrical drum. The amount of rubber reduced in the specimen due to wear was measured. At least three samples are tested and averaged over one composition. By weighing the initial and final samples, the wear parts were determined in grams (g) or milligrams (mg). Considering the density of the specimen (constant: 1.0 g/m 3), the wear volume was calculated using the rate of change of mass with respect to density. The amount of wear was calculated using the following formula, and the results are shown in Table 5 below.

$$\text{Wear} = (M1-M2)/\text{Density} \quad \text{[Calculation formula]}$$

TABLE 5

| Properties/codes | S2 | A1 | A2 | B1 | B2 | C1 | C2 |
|---|---|---|---|---|---|---|---|
| scorch time (t s2) | 0.6 | 0.87 | 1.1 | 0.82 | 0.93 | 0.80 | 0.93 |
| Cleanup time (T90) | 2.0 | 7.2 | 10.1 | 5.3 | 13.9 | 14.5 | 13.9 |
| M L (dNm) | 18.7 | 18.4 | 16.9 | 19.4 | 19 | 13.9 | 19.0 |
| M H (dNm) | 31.7 | 68.4 | 45.0 | 76.5 | 70 | 55.2 | 74.5 |
| tensile strength (MPa) | 10.1 | 13.3 | 11.8 | 15.2 | 12 | 19.4 | 16.0 |
| 100% Modulus (MPa) | 2.3 | 5.7 | 5.5 | 4.3 | 7 | 4.1 | 7.0 |
| 200% Modulus (MPa) | 8.0 | 4.2 | — | 7.9 | 10 | 9.5 | 14.3 |
| tensile at crushed (%) | 395.5 | 260.6 | 189.6 | 361.3 | 250 | 382.9 | 223.6 |
| Rebound At 25° C. | 37.0 | 44.5 | 42.2 | 42.0 | 28.0 | 28.5 | 46.0 |
| Hardness (shore A) | 68.0 | 74.0 | 79.0 | 74.5 | 60 | 76.0 | 75 |
| Wear Loss (mm 3) | 190 | 185 | 190 | 200 | 160 | 180 | 169 |
| Contact Angle ( o) | 85.0 | 74.0 | 79.0 | 74.5 | 90 | 95 | 89.3 |
| water swelling rate (%) | 2.4 | 20 | 30 | 25 | 40 | 30 | 70 |
| electric resistivity ( ') U | 35.0 | 70.0 | 65 | 69 | 55 | 59 | 60.4 |

As can be seen in Table 5, at high electric conductivity, relatively low water swelling properties were confirmed in S2 in a state where the contact angle measurement was poor. This shows that a higher TDAE content is needed to ensure effective mixing and proper dispersion of the filler within the blend. Therefore, it was confirmed that S2 is a suitable condition to satisfy the core purpose of the present disclosure. In order to manufacture a tire electrode having non-pneumatic conductivity and hydrophilicity using the composition prepared as described above, FIG. 1 explains hot plastic curing process using a hot press (Hot Press) of prepared mixture shows the materials shown in Tables 1 to 4 in a composition ratio using a two-roll mill. In other words, the mixture before curing is produced in the form of strips, while strips are being stacked the wire for external connection is buried between the strips, heat is applied at 100 to 190 Celsius degrees, 5 MPa pressure is applied, and after a certain period of time, curing process is completed.

Figure 2:
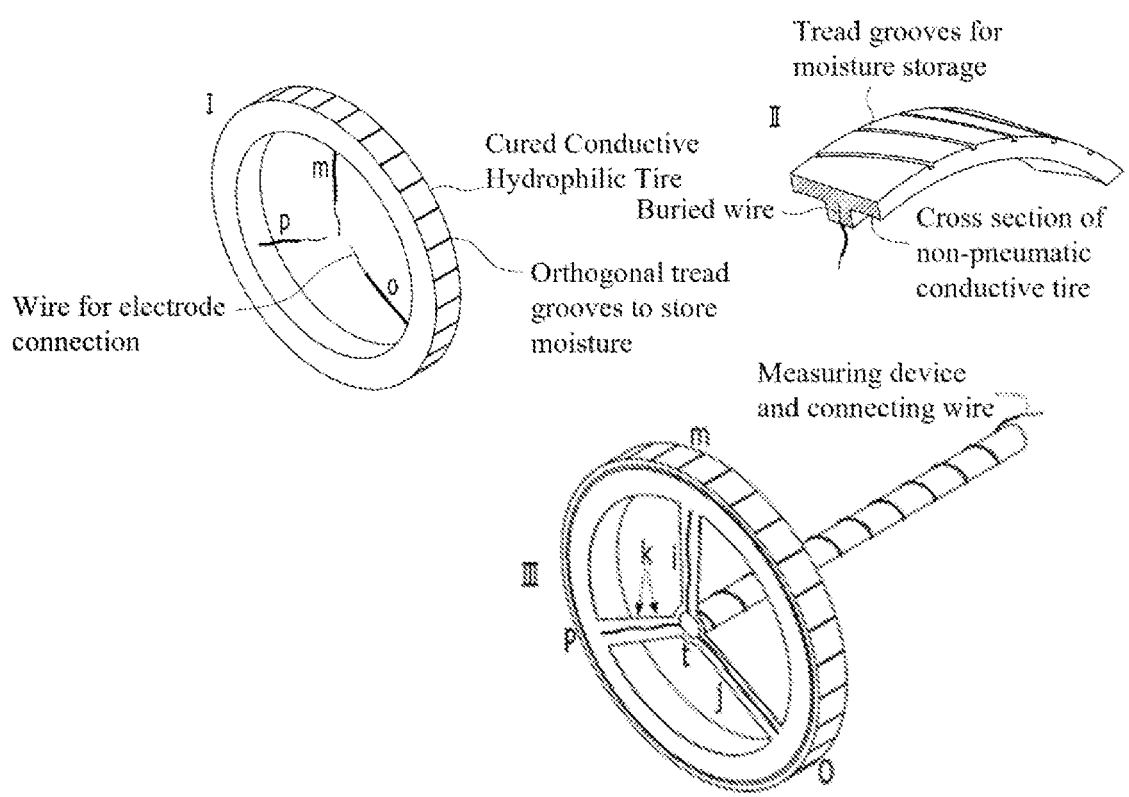
FIG. 2 is a showing the characteristics of the final product after manufacturing according to an embodiment of the present disclosure.

FIG. 2 shows a conductive hydrophilic tire that has been commercialized after the curing process of FIG. 1 has been completed. First, several connecting wires inserted between the strips have connected each other, and the wires are connected to an external measuring device. In addition, the surface of the tire electrode has grooves in a direction perpendicular to an outer peripheral surface of the tire electrode, so that water can be stored so that the water does not flow down the surface of the tire electrode. The water stored in this groove forms a thin water film on the outer surface of the tire electrode during rotation, improving conductivity when in contact with the ground.

Figure 3:
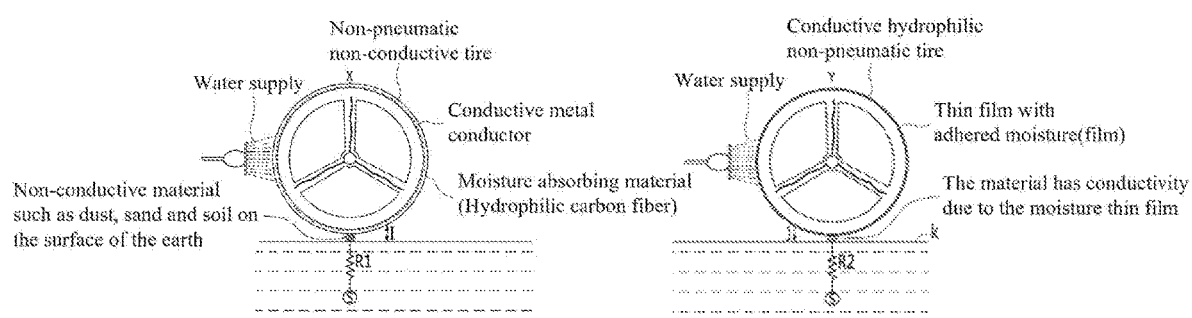
FIG. 3 is a side view comparing the present disclosure and the prior art.

In this way, FIG. 3 explains in comparison with the previous technology in that an efficiency can be increased through resulting in lower resistance by making the tire electrode manufactured has improved electrical contact with the ground by using presented patent technology that the water film is formed on the outer peripheral surface while the tire electrode is rotating, although the proportion of water swelling material is lower than that of the previous technology.

Figure 4:
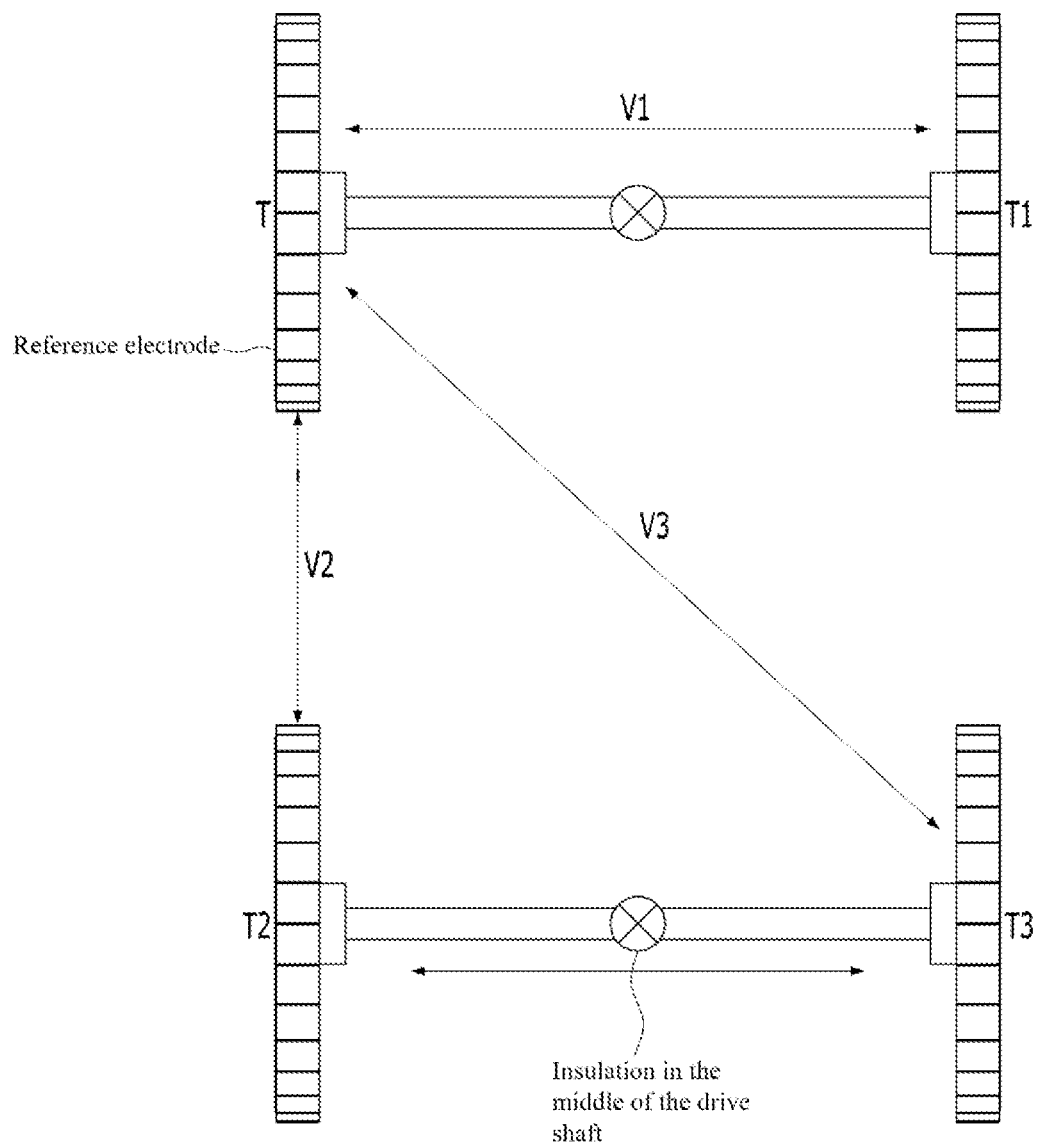
FIG. 4 is a diagram showing a recognition circuit for detecting a leakage potential difference according to an embodiment of the present disclosure.

FIG. 4 illustrates the configuration of the tire electrode.

In other words, FIG. 4 explains that tire electrode T is determined as a reference electrode and a configuration of measuring the earth potential values of V1, V2, and V3. In addition, a metal drive shaft is insulated between the electrodes so that measurement values of individual tire electrodes are maintained without interference.

Figure 5:
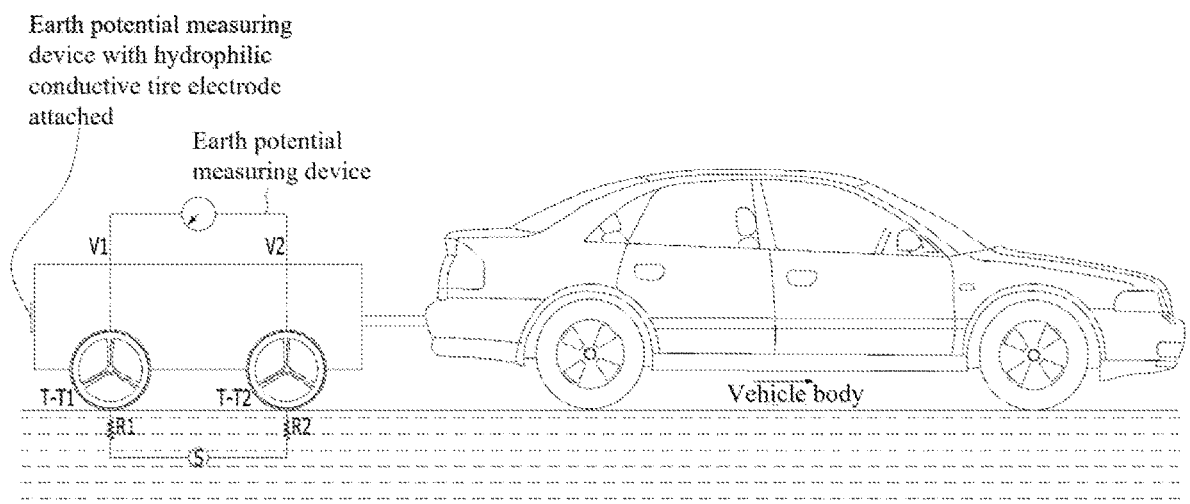
FIG. 5 is a diagram schematically showing a method of measuring the ground leakage state and the leakage power in real time according to an embodiment of the present disclosure.

To reduce wear rate of the tire electrode, which is the purpose of the present disclosure, the tire electrode is connected to a trailer instead of a vehicle body, FIG. 5 shows a method for improving a wear rate that caused by friction when moving due to a weight burden.

Figure 6:
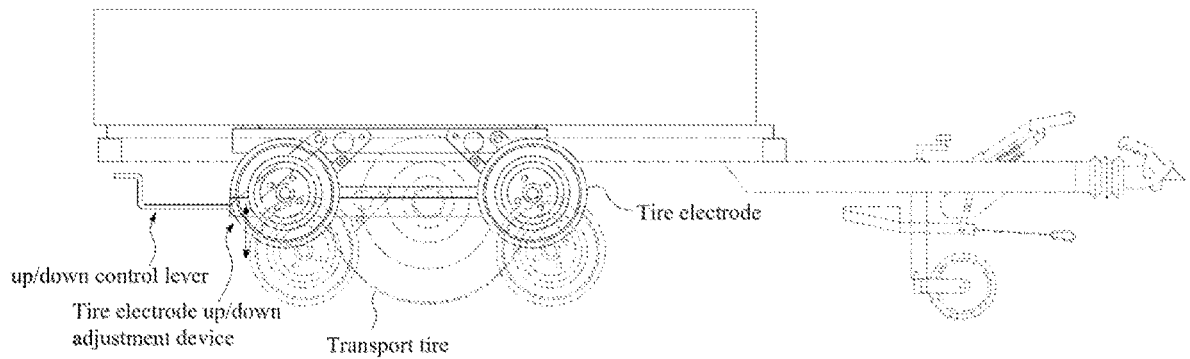
FIG. 6 is a side view of a trailer equipped with a separate driving tire and an auxiliary tire electrode installed to reduce abrasion of the tire electrode during driving according to an exemplary embodiment of the present disclosure.

FIG. 6 shows a side view of the device to reduce wear and prolong the life of the tire electrode by making the tire electrode come into contact with the ground surface only at the measuring location, installed with a vertical adjustment device in case that running tire is attached, wherein the running tire bears the trailer load, separately from the tire electrode.

Figure 7:
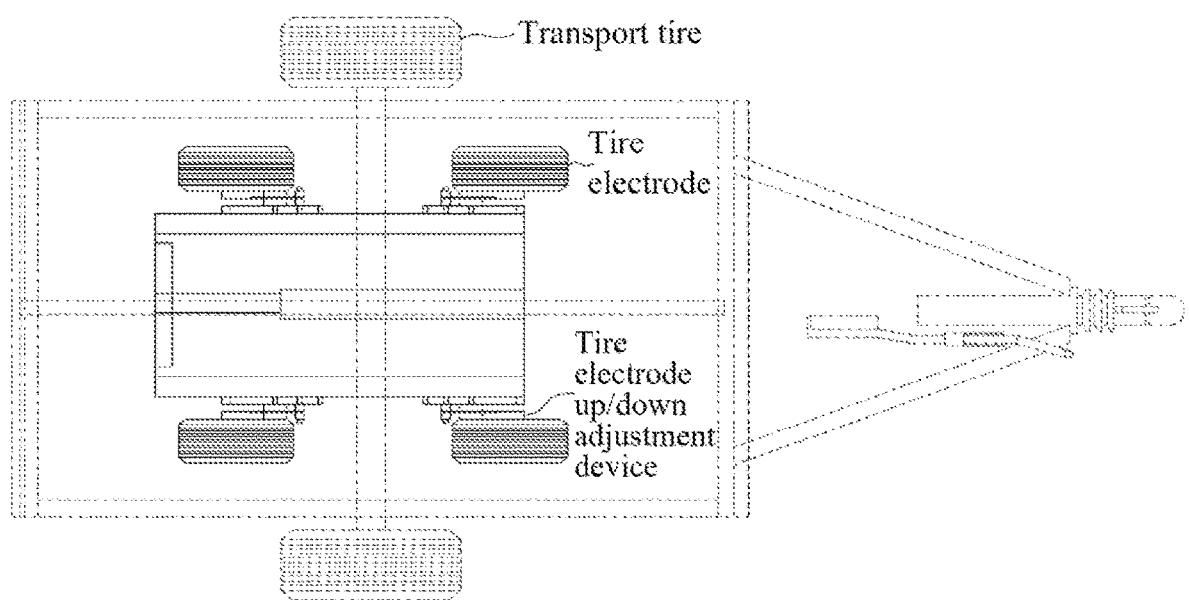
FIG. 7 is a rear view of a trailer equipped with a separate running tire and an auxiliary tire electrode installed to reduce abrasion of the tire electrode during operation according to an embodiment of the present disclosure.

FIG. 7 shows the rear surface of FIG. 6

[Advantageous Effects]

The present disclosure relates to a tread compound and a method for manufacturing the same for manufacturing a tire having high electrical conductivity and excellent wear resistance and absorption characteristics. Specifically, the present disclosure relates to the manufacture of a tire compound to be used as a non-pneumatic tire. Instead of lowering the water swelling absorbent, natural rubber is used as the main material of the polar rubber to improve wear resistance and maintain excellent conductivity. In addition, in order to reduce unnecessary wear and tear during operation, the tire electrode attached to the trailer, not the vehicle body, comes into contact with the ground and can be used as a moving electrode with water supply connected through the sensor to detect the underground leakage potential by the stray current.

The description of the embodiments presented above is provided to enable any person skilled in the art to use or practice the present disclosure. Various modifications to these embodiments will be readily apparent to those skilled in the art, and the generic principles defined herein may be applied to other embodiments without departing from the scope of the present disclosure.

[Modes for Carrying Out the Invention]

As described above, the relevant contents are described in the best mode for carrying out the invention.

INDUSTRIAL APPLICABILITY

The present disclosure relates to a tire tread composition having high electric conductivity and an absorption property having excellent wear resistance, and a method for manufacturing the same.

What is claimed is:

1. A tire electrode comprising:
   strips made by a conductive hydrophilic tire composition;
   an electric wire embedded between the strips; and
   a groove formed in a direction perpendicular to an outer circumferential surface of the strips configured to form a water film during movement,
   wherein the conductive hydrophilic tire composition comprises:
   a polar rubber having an amount of 10 to 100 parts by weight of based on 100 parts by weight of the total rubber component;
   a water swelling material having an amount of 1 to 10 parts by weight of based on 100 parts by weight of the total rubber component;
   a carbon black having an amount of 5 to 30 parts by weight of based on 100 parts by weight of the total rubber component; and
   a silica having an amount of 2 to 10 parts by weight of based on 100 parts by weight of the total rubber component,
   wherein the tire electrode is prepared by the steps of,
   forming the conductive hydrophilic tire composition into the strips before curing,
   laminating the strips in a plurality of layers,
   embedding the electric wire between the strips and connecting to a measuring device.

2. The tire electrode of claim 1, wherein the tire electrode is attached to a traction type device, by reducing tire friction resistance due to weight reduction to improve a wear rate.

3. The tire electrode of claim 1, wherein the tire electrode is installed together with a separate driving tire, to improve a wear rate by reducing a weight burden to improve a wear rate.

4. The tire electrode of claim 1, wherein the tire electrode is installed together with a vertical adjustment device and is measuring by contacting the ground surface when necessary.

5. A movable defect location detection device comprising the tire electrode according to claim 1.

* * * * *